Patented Feb. 9, 1926.

1,572,670

UNITED STATES PATENT OFFICE.

RALPH EMERSON MYERS, OF EAST ORANGE, NEW JERSEY, ASSIGNOR TO WESTINGHOUSE LAMP COMPANY, A CORPORATION OF PENNSYLVANIA.

INCANDESCENT LAMP.

No Drawing.   Application filed June 25, 1921. Serial No. 480,469.

*To all whom it may concern:*

Be it known that I, RALPH EMERSON MYERS, a citizen of the United States, and a resident of East Orange, in the county of Essex and State of New Jersey, have invented a new and useful Improvement in Incandescent Lamps, of which the following is a specification.

This invention relates to incandescent electric lamps and more particularly to the composition of the envelope used in lamps of the gas filled type.

An object of the invention is to provide an envelope for a gas filled lamp which is resistant to the chemical action of the enclosed gas.

Another object of the invention is the provision of an envelope of such character as to be particularly suitable for lamps in which hydrogen is used.

Other objects of the invention will be apparent from the following description.

In lamps of the gas filled type, a gas is enclosed which under operating conditions has a pressure substantially that of the atmosphere. The function of this gas is principally to prevent evaporation of the filament but in certain types of lamps, as for instance those used for signaling purposes, a gas having high heat conductivity such as hydrogen, is required to produce the necessary quenching effect in addition to retarding the vaporization of the filament.

In the present form of high speed signal lamps wherein hydrogen is the enclosed gas, difficulty has been experienced from the fact that the hydrogen has a reducing effect upon the envelope, particularly if it is composed of a glass containing lead. The hydrogen reduced the lead contained in the glass which action is manifested by a blackening of the envelope or bulb. This blackening usually occurs immediately above the filament and appears in the form of a spot which continues to enlarge forming a light obscuring deposit on the bulb. This deposit in turn absorbs appreciably more heat which renders plastic the glass covered thereby with the consequent result that frequently the bulb is ruptured by the internal pressure of the gas.

I have discovered that by using glass free of lead the deleterious effects just mentioned are practically eliminated. This follows from the fact that no lead being present, the hydrogen cannot react or reduce the same, thus avoiding the occurrence of a condition which makes possible the subsequent rupture of the envelope.

Any form of glass free of lead may be used for the envelope, as for instance, lime glass. Hydrogen apparently has no chemical action with the constituent parts of common forms of lime glass or the particles given off by the filament and, therefore, a detrimental coating or blackening of the bulb is avoided on the surface thereof.

I have found that incandescent lamps constructed of lead free glass and employed for signaling purposes have proven very successful and the interior of the surface of the envelopes remains substantially clear during the lives of the lamps.

From the foregoing, it will be appreciated that my invention in its broadest aspect contemplates an envelope resistant to the chemical action of an enclosed gas and although the specific example described is a lead free glass used as the envelope for a hydrogen filled lamp, nevertheless, it may be found that other gases react in a corresponding manner with other glasses. In such an event, it is merely a case of selecting a glass which is chemically resistant to a given gas and such modifications are considered as being within the scope of this invention as defined by the appended claims.

What is claimed is:

1. An electric device having an envelope filled with hydrogen and resistant to the chemical action thereof, whereby blackening of the envelope during operation of the device is avoided.

2. An incandescent lamp comprising a bulb having a hydrogen filling and comprised of glass free of lead to permit an operation of a lamp in the absence of blackening of the envelope.

3. An incandescent lamp filled with hydrogen and having the bulb of said lamp made of glass, the constituents of which are non-reactant with hydrogen or with particles given off by the filament.

4. In an incandescent lamp, an envelope filled with hydrogen, said envelope being free of materials which are reduced by the hydrogen or by filament particles whereby blackening of the bulb is avoided.

5. An incandescent electric lamp comprising a lead-free envelope enclosing a filling of hydrogen, whereby blackening of the envelope during operation is avoided.

6. An incandescent electric lamp comprising a chemically active gas under a substantial pressure enclosed in an envelope of such a composition as to be chemically unaffected by the gas to prevent blackening of the envelope during operation of the lamp.

In testimony whereof, I have hereunto subscribed my name this 24th day of June 1921.

RALPH EMERSON MYERS.